United States Patent [19]

Numata

[11] Patent Number: 6,150,446
[45] Date of Patent: Nov. 21, 2000

[54] DESTATICIZING THERMOPLASTIC RESIN COMPOSITION

[75] Inventor: Takayoshi Numata, Chiba, Japan

[73] Assignee: Teijin Limited, Osaka, Japan

[21] Appl. No.: 09/141,107

[22] Filed: Aug. 27, 1998

[30] Foreign Application Priority Data

Aug. 29, 1997 [JP] Japan ..................................... 9-234278
Aug. 29, 1997 [JP] Japan ..................................... 9-264479
Oct. 6, 1997 [JP] Japan ..................................... 9-272597

[51] Int. Cl.⁷ ............................... C08K 3/10; C08K 3/08; C08K 3/20
[52] U.S. Cl. .......................... 524/406; 524/434; 524/439; 524/441; 524/500; 524/424; 524/507; 524/508; 524/513; 524/514; 524/515
[58] Field of Search ..................................... 524/406, 424, 524/434, 439, 441, 500, 507, 508, 513, 514, 515

[56] References Cited

U.S. PATENT DOCUMENTS 5,171,479 12/1992 Maki et al. .............................. 252/511
5,780,127 7/1998 Mikkelsen .............................. 428/35.7

FOREIGN PATENT DOCUMENTS 60-27700 2/1985 Japan .
62-78217 4/1987 Japan .
4-8769 1/1992 Japan .
7-173325 7/1995 Japan .
8-88266 4/1996 Japan .

*Primary Examiner*—Kriellion Sanders
*Attorney, Agent, or Firm*—Sughrue, Mion, Zinn, Macpeak, & Seas, PLLC

[57] ABSTRACT

A destaticizing thermoplastic resin composition compristing (A) a thermoplastic resin;

(B) a polymer having a surface resistivity measured at 500 V of $10^8$ to $10^{11}$ Ω, a melting point of 100° C. or higher, an apparent malt viscosity at an apparent shear rate at 260° C. of 1,000 sec$^{-1}$ of 10 to 1,000 Pa·s, and a ratio of the above apparent melt viscosity to the apparent melt viscosity of the thermoplastic resin at an apparent shear rate at 260° C. of 1,000 sec$^{-1}$ of 0.01 to 1.3; or a carbon fiber having a diameter of 1 nm to 1 μm, a length of 1 μm to 10 mm and a volume resistivity of less than 1 Ωcm; or a combination of the polymer and the carbon fiber; and (C) a fibrous conductive filler having a volume resistivity of 100 Ω·cm or less.

The destaticizing composition is useful for preparation of a carrier jig for use in an electronic field.

30 Claims, 1 Drawing Sheet

Gate side

DESTATICIZING THERMOPLASTIC RESIN COMPOSITION

DETAILED DESCRIPTION OF THE INVENTION

Figure 1:
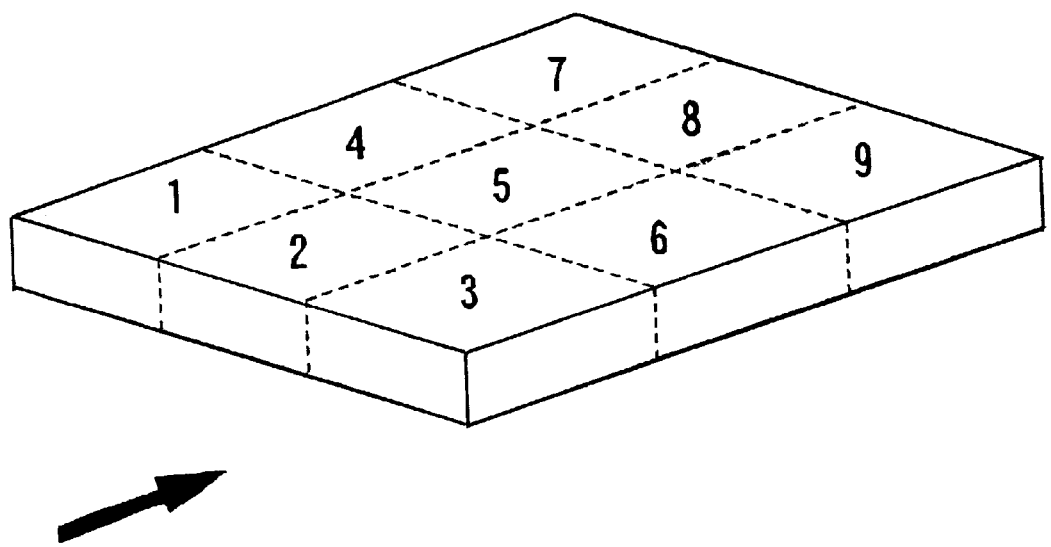

The present invention relates to a destaticizing thermoplastic resin composition and to a carrier jig made therefrom for use in an electronic field. More specifically, it relates to a thermoplastic resin composition which is readily electrified and has excellent destaticizing properties that voltage attenuates swiftly even when it is electrified and to a carrier jig made therefrom for use in the electronic field.

A thermoplastic resin is readily electrified by friction or peeling and causes various problems in its molded products, such as impact and adhesion of dust caused by discharging at the time of use.

As means of providing antistatic properties to a thermoplastic resin, there have been known a method in which a low-molecular antistatic agent such as a phosphonium salt of alkyl sulfonic acid is used (JP-A 62-230835) (the term "JP-A" as used herein means an "unexamined published Japanese patent application") and a method in which a high-molecular antistatic agent such as a polyether ester amide is used. The low-molecular antistatic agent has a large initial effect but loses its antistatic properties when it is used to wipe something or washed. Thus, its performance changes according to environmental changes. The high-molecular antistatic agent has a problem with heat resistance or melt stability in many cases when it is used in engineering plastics, and it is difficult to reduce saturation voltage to 1 kV or less and voltage half-attenuation time to 10 sec or less (application voltage of 10 kV) simply by increasing the content of the high-molecular antistatic agent. Even if the high-molecular antistatic agent can exhibit this performance, deterioration in physical properties and a problem with productivity will occur.

As means of providing antistatic properties and rigidity to a thermoplastic resin, there is known a method in which a carbon fiber is added (JP-A 8-88266). In the case of a carbon fiber alone, it is possible to reduce resistivity and saturation voltage by increasing its content but it is difficult to reduce voltage half-attenuation time to 10 sec or less (application voltage of 10 kV). Further, a method in which a conductive filler or powder having a small aspect ratio is combined with a carbon fiber or stainless fiber satisfies the above requirements but is not preferred as a carrier jig for use in the electronic field because waste conductive powders are produced at the time of molding.

JP-A 7-173325 discloses an antistatic resin composition which comprises an organic macromolecular material, a carbon-based conductive filler and a non-carbon-based conductive filler having a volume resistivity of 0.5 to $10^8$ Ωcm. This composition has such an advantage that the amount of an expensive non-carbon-based conductive filler used can be reduced.

Further, JP-A 4-8769 discloses an antistatic and ionic conductive resin composition which comprises 100 parts by weight of a resin, 0.1 to 70 parts by weight of a high-molecular weight compound having an average molecular weight of 10,000 or more and obtained by reacting polyoxyalkylene glycol and a polyvalent carboxylic acid or an organic polyisocyanate, and 0.1 to 30 parts by weight of a conductive filler. This publication names powder and granular materials as illustrative examples of the above conductive filler. The powder or granular material is not preferred as a carrier jig for use in the electronic field because it often falls off at the time of molding or use.

A water carrier jig preferably has a diameter of 12 inches or more to improve the productivity of silicon wafers. A thermoplastic resin composition prepared simply by adding an high-molecular antistatic agent to a thermoplastic resin is preferred because it rarely suffers from differences in antistatic properties by a washing step and such a problem as the contamination of silicon wafers by a dissolution metal. However, it is unsatisfactory in terms of rigidity and abrasion resistance as a carrier jig having a diameter of 12 inches or more and cannot be incorporated into automation. Along with an increase in the integration of integrated circuits, the size of particles causing electrostatic interferences is becoming very small, and current antistatic properties are insufficient.

Meanwhile, when a low-molecular antistatic agent is used as a carrier jig for use in the electronic field, the amount of a dissolution metal in the washing step is large, thereby causing the lack of crystals for devices and reductions in electric properties.

When a carbon fiber is added to a thermoplastic resin, it is difficult to obtain stable conductive properties according to the shape of a carrier jig for use in the electronic field even by adding a large amount of the carbon fiber (may be abbreviated as CF hereinafter). This is probably because of poor dispersibility of CF. On the other hand, when a small amount, namely 8 wt %, of CF is added, the voltage half-attenuation time is 600 sec or more (when the application voltage is 10 kV) on the surface of a carrier jig, and only a carrier jig from which a charge is hardly leaked and which has unsatisfactory antistatic properties can be obtained.

It is an object of the present invention to provide a thermoplastic resin composition having high and permanent antistatic properties, excellent destaticizing properties and small differences in antistatic properties (saturation voltage and voltage half-attenuation time) on the surface of a molded product.

It is another object of the present invention to provide a carrier jig for use in the electronic field which is made from a resin composition having excellent destaticizing properties, and has high rigidity required for a large-sized carrier jig and uniform and excellent antistatic properties on the surface.

It is still another object of the present invention to provide a carrier jig for use in the electronic field which has high rigidity required for a large-sized silicon wafer carrier jig such as a 12-inch or more silicon wafer carrier jig, uniform and excellent antistatic properties on the surface, excellent destaticizing properties and extremely small differences in antistatic properties (saturation voltage and voltage half-attenuation time) on the surface of a molded product.

Other objects and advantages of the present invention will be apparent from the following description.

According to the present invention, firstly, the above objects and advantages of the present invention can be attained by a destaticizing thermoplastic resin composition (may be referred to as "first composition of the present invention" hereinafter) which is a compound comprising:

(A) 100 parts by weight of a thermoplastic resin;

(B) 10 to 200 pats by weight of a polymer having a surface resistivity measured at 500 V of $10^8$ to $10^{11}$Ω, a melting point of 100° C. or higher, an apparent melt viscosity at an apparent shear rate at 260° C. of 1,000 $sec^{-1}$ of 10 to 1,000 Pa·s, and a ratio of the above apparent melt viscosity to the apparent melt viscosity of the above thermoplastic resin at an apparent shear rate at 260° C. of 1,000 $sec^{-1}$ of 0.01 to 1.3; and (C) 1 to 100 parts by weight of a fibrous conductive filler having a volume resistivity of 100 Ωcm or less.

FIG. 1 shows the distribution of voltage half-attentuation times of a molded silicon wafer carrier.

The first composition of the present invention will be described hereinunder.

Thermoplastic Resin (A)

The thermoplastic resin used in the present invention is a polymer comprising a structural units derived from at least one monomer selected from the group consisting of styrenes, (meth)acrylate esters, (meth)acrylonitrile and butadiene, polyolefin, polyester, polycarbonate, acryl resin, thermoplastic polyurethane, polyvinyl chloride, fluororesin, polyamide, polyacetal, polysulfone or polyphenylene sulfide. They may be used alone or in combination of two or more.

The styrenes include styrene and substituted styrenes such as methylstyrene.

Resins composed of a polymer and/or a copolymer having at least one structural unit selected from the group consisting of styrenes, (meth)acrylates, (meth)acrylonitrile and butadiene include polystyrene, styrene/acrylonitrile copolymer, acrylonitrile/butadiene/styrene copolymer, methyl methacrylate/butadiene/styrene copolymer, methyl methacrylate/ethyl methacrylate/butadiene/styrene copolymer and styrene/methyl methacrylate/acrylonitrile copolymer.

The polyolefin is, for example, polyethylene or polypropylene.

The polyester is preferably an aromatic polyester comprising terephthalic acid or 2,6-naphthalenedicarboxylic acid as a main acid component and an aliphatic diol such as ethylene glycol, trimethylene glycol, tetramethylene glycol, hexamethylene glycol or neopentyl glycol as a main diol component.

The "main acid component" means an acid component which is contained in an amount of 70 mol % or more, preferably 80 mol % or more, more preferably 90 mol % or more based on the total of all acid components and the "main diol component" means a diol component which is contained in an amount of 70 mol % or more, preferably 80 mol % or more, more preferably 90 mol % or more based on the total of all diol components.

Out of the aromatic polyesters, polybutylene terephthalate, polypropylene terephthalate, polyethylene terephthalate and polybutylene-2,6-naphthalate having high crystallization speed are preferred, and polybutylene terephthalate is particularly preferred.

The polyester may be a substituted polyester part of which is substituted by a copolymerizable component. Illustrative examples of the copolymerizable component include isophthalic acid, phthalic acid; alkyl substituted phthalic acids such as methyl terephthalic acid and methyl isophthalic acid; naphthalenedicarboxylic acids such as 2,6-naphthalenedicarboxylic acid, 2,7-naphthalenedicarboxylic acid and 1,5-naphthalenedicarboxylic acid; aromatic dicarboxylic acids such as diphenyldicarboxylic acids exemplified by 4,4-diphenyldicarboxylic acid and 3,4-diphenyldicarboxylic acid and diphenoxyethanedicarboxylic acids exemplified by 4,4-diphenoxyethanedicarboxylic acid; aliphatic and alicyclic dicarboxylic acids such as succinic acid, adipic acid, sebacic acid, azelaic acid, decanedicarboxylic acid and cyclohexanedicarboxylic acid; alicyclic diols such as 1,4-cyclohexanedimethanol; dihydroxybenzenes such as hydroquinone and resorcin; aromatic diols such as ether diols obtained from bisphenols such as 2,2-bis(hydroxyphenyl)-propane and bis(4-hydroxyphenyl)sulfone and glycols such as ethylene glycol; oxycarboxylic acids such as ε-oxycaproic acid, hydroxybenzoic acid and hydroxyethoxybenzoic acid; and the like. The above aromatic polyesters may contain a polyfunctional ester forming acid such as trimesic acid or trimellitic acid, or a polyfunctional ester forming alcohol such as glycerin, trimethylolpropane or pentaerythritol in an amount of 1.0 mol % or less, preferably 0.5 mol % or less, more preferably 0.3 mol % or less as a ramification component.

The polyester used in the present invention preferably has an intrinsic viscosity of 0.6 to 1.2. When the intrinsic viscosity is lower than 0.6, sufficient properties cannot be obtained and when the intrinsic viscosity is higher than 1.2, melt viscosity increases and flowability lowers, thereby impairing moldability disadvantageously. The intrinsic viscosity is a value measured at 35° C. in orthochlorophenol.

The polycarbonate is preferably a polycarbonate comprising a bisphenol such as 2,2-bis(4-hydroxyphenyl)propane as a diol component.

The fluororesin is, for example, a copolymer of tetrafluoroethylene and perfluoropropylene.

The acryl resin is, for example, polymethyl methacrylate or polymethyl acrylate.

The thermoplastic polyurethane is a polyurethane comprising a polyester or a polyether as a soft segment and a polyester as a hard segment.

The polyamide is, for example, nylon 4, nylon 6, nylon 6,6 or nylon 12.

The polyacetal is, for example, polyoxymethylene.

The polysulfone is, for example, polyphenyl sulfone.

Out of these, preferred are a polyester, polystyrene, polymethyl methacrylate, styrene/acrylonitrile copolymer, acrylonitrile/butadiene/styrene copolymer, methyl methacrylate/butadiene/styrene copolymer, styrene/methyl methacrylate/acrylonitrile copolymer, polyproylene and polyethylene.

Polymer (B)

The polymer (B) used in the present invention has a surface resistivity of $10^8$ to $10^{11}$ Ω. The surface resistivity is a value measured at a voltage of 500 V.

The polymer used in the present invention has an apparent melt viscosity at an apparent shear rate at 260° C. of 1,000 sec$^{-1}$ of 10 to 1,000 Pa·s and a ratio of the above apparent melt viscosity to the apparent melt viscosity of the thermoplastic resin under the same condition (apparent shear rate at 260° C. of 1,000 sec$^{-1}$) of 0.01 to 1.3. The apparent melt viscosity is preferably 10 to 500 Pa·s and the ratio is preferably 0.01 to 0.8.

If the melt viscosity falls within the above range, when compatibility between the thermoplastic resin (A) and the polymer (B) used in the present invention is essentially low and the thermoplastic resin (A) and the polymer (B) having different melt viscosities are both molten, mixed and molded, the polymer (B) is dispersed in the form of a stripe (a short diameter of 1 μm or less and a long diameter of 1 μm or more with an aspect ratio of 3 or more in a thermoplastic resin phase within a surface area of 20 μm, preferably with an aspect ratio of 50 or more) or a net, whereby the polymer (B) can intersect a fibrous conductive filler (200 to 300 μm in length in the case of CF) and a fine conductive path is formed in the surface portion of a molded product. This is the reason why extremely excellent antistatic properties are provided. If the ratio is outside the above range, the continuous phase of the polymer (B) is not formed, the possibility of intersection between the polymer (B) and the fibrous conductive filler lowers, and antistatic properties deteriorate. The melting point of the polymer (B) is 100° C. or higher, preferably 150° C. or higher. When a polymer having a melting point lower than 100° C. is used and compounded with an engineering plastic such as a polyester, there is a problem with heat resistance and sufficient antistatic properties cannot be provided.

The polymer (B) used in the present invention is preferably a polyethylene glycol-based polyamide copolymer, polyethylene glycol methacrylate copolymer, poly(ethylene oxide/propylene oxide) copolymer, polyethylene glycol-based polyesteramide, polyethylene glycol-based polyester elastomer, poly(epichlorohydrin/ethylene oxide) copolymer or polyetheresteramide derived from an ethylene oxide adduct of a bisphenol with a polyamide having a carboxyl group at both terminals.

Out of these polymers, a polyether ester amide derived (polymerized) from an ethylene oxide adduct of a bisphenol with a polyamide having a carboxyl group at both terminals is particularly preferred.

The polyamide having a carboxyl group at both terminals of the polyether ester amide preferably has a number average molecular weight of 500 to 5,000, more preferably 500 to 3,000. When the number average molecular weight is less than 500, the heat resistance of the polyether ester amide itself lowers and when the number average molecular weight is more than 5,000, reactivity lowers, thereby boosting the production cost of the polyether ester amide.

The ethylene oxide adduct of the bisphenol of the polyether ester amide preferably has a number average molecular weight of 1,600 to 3,000 and the number of mols of the ethylene oxide is preferably 32 to 60. When the number average molecular weight is less than 1,600, antistatic properties are insufficient and when the number average molecular weight is more than 3,000, reactivity lowers, thereby boosting the production cost of the polyether ester amide.

A method of producing the polyether ester amide is not particularly limited and known methods can be used. For instance, a polyamide having a carboxyl group at both terminals is formed by reacting an amide forming monomer with a dicarboxylic acid, an ethylene oxide adduct of a bisphenol is added to the polyamide, and a polymerization reaction is carried out at a high temperature and a reduced pressure.

In the present invention, the amount of the polymer (B) is 10 to 200 parts by weight, preferably 10 to 100 parts by weight, more preferably 15 to 30 parts by weight based on 100 parts by weight of the thermoplastic resin. When the amount is larger than 200 parts by weight, mechanical strength and productivity lower and when the amount is smaller than 10 parts by weight, the voltage half-attenuation time is long and sufficient antistatic properties cannot be obtained.

Fibrous Conductive Filler

The fibrous conductive filler having a volume resistivity of 100 Ωcm (C) or less used in the present invention is preferably a carbon fiber, metal fiber, metal-based whisker, ceramic-based whisker or organic polymer-based whisker. Preferred examples of the carbon fiber include carbon fiber and nickel coated carbon fiber. When the fibrous conductive filler is a metal fiber, the metal fiber is preferably produced by a wire drawing, melt extrusion, melt extraction, cutting or plating method and made from Fe, Ni, Cu, Al, Pb, SUS (chromium steel) or Zn. Out of these, carbon fiber is the most suitable to provide high rigidity and antistatic properties which are requirements for a large carrier jig for use in the electronic field.

The amount of the fibrous conductive filler having a volume resistivity of 100 Ωcm or less (C) used in the present invention is 1 to 100 parts by weight, preferably 10 to 30 parts by weight based on 100 parts by weight of the thermoplastic resin. When the amount is larger than 100 parts by weight, extrudability and moldability lower, which is economically disadvantageous and not practical. when the amount is smaller than 1 part by weight, rigidity required for a large carrier jig cannot be provided and the effect of leaking a charge is small disadvantageously.

When the carbon fiber is used in an amount of more than 100 parts by weight, fine waste carbon is produced at the time of molding, which may cause the contamination of a silicon wafer.

Use of carbon black or metal powders is not preferred from the view point of preventing the contamination of a silicon wafer, and a combination of the fibrous conductive filler of the present invention which can leak a charge effectively without the contamination of a silicon wafer and a heat resistant antistatic polymer is useful.

When a resin composition comprising a polyether ester amide and CF out of the resin compositions of the present invention is used in a silicon wafer carrier jig, metal impurities rarely ooze out to the surface of the silicon wafer carrier jig at the time of a heat treatment and hence, the surface of a silicon wafer is not stained by transfer.

For instance, when a carbon fiber is used alone, differences in antistatic properties occur on the surface of a carrier jig for use in the electronic field. This is probably because the dispersibility of the carbon fiber is low, the carbon fiber is not distributed properly due to the shape of the carrier jig, and a portion having a low distribution density of the carbon fiber is produced.

When a heat resistant antistatic polymer having a specific melt viscosity and a fibrous conducive filler are used in combination in the present invention, the leakage of a charge is greatly promoted. That is, by causing the antistatic polymer to be existent in a portion where the fibrous conductive filler is not dispersed which is produced dependent on the shape of a molded product, the leakage of a charge is greatly promoted. Further, this resin composition can greatly reduce differences in antistatic properties which cannot be attained by a conventional resin composition, particularly differences in the antistatic properties of a product molded thereof.

Studies conducted by the inventor of the present invention have made it clear that it is possible to provide a thermoplastic resin composition which can obtain the same excellent destaticizing properties as the first composition of the present invention even when a very fine and short carbon fiber is used in the above first composition of the present invention in place of the above polymer (B), can achieve excellent destaticizing properties when the content of the polymer (B) is reduced and the above polymer (B) and the above carbon fiber are used in combination, and have more excellent physical properties than the first composition of the present invention.

That is, according to the present invention, secondly, there is provided a destaticizing resin composition (may be referred to as "second composition of the present invention" hereinafter) which is a compound comprising:

(A) 100 parts by weight of a thermoplastic resin;

(B) 1 to 30 parts by weight of a carbon fiber having a diameter of 1 nm to 1 µm, a length of 1 µm to 10 mm and a volume resistivity of less than 1 Ωcm; and (C) 1 to 100 parts by weight of a fibrous conductive filler having a volume resistivity of 100 Ωcm or less.

According to the present invention, thirdly, there is provided a destaticizing resin composition (may be referred to as "third composition of the present invention" hereinafter) which is a compound comprising:

(A) 100 parts by weight of a thermoplastic resin;

(B) 0.01 to 150 parts by weight of a polymer having a surface resistivity measured at 500 V of $10^8$ to $10^{11}$ Ω, a melting point of 100° C. or higher, an apparent melt viscosity at an apparent shear rate at 260° C. of 1,000 $sec^{-1}$ of 10 to 1,000 Pa·s, and a ratio of the above apparent melt viscosity to the apparent melt viscosity of the above thermoplastic resin at an apparent shear rate at 260° C. of 1,000 $sec^{-1}$ of 0.01 to 1.3;

(B') 0.01 to 28 parts by weight of a carbon fiber having a diameter of 1 nm to 1 µm, a length of 1 µm to 10 mm and a volume resistivity of less than 1 Ωcm; and (C) 1 to 100 parts by weight of a fibrous conductive filler having a volume resistivity of 100 Ωcm or less.

As for what is not described of the second composition of the present invention herein, it should be understood that a description of the first composition is directly applied to the second composition of the present invention.

Carbon Fiber (B')

In the present invention, a carbon fiber (B') having a diameter of 1 nm to 1 µm, a length of 1 µm to 10 mm and a volume resistivity of less than 1 Ωcm is used. The carbon fiber preferably has a diameter of 1 nm to 500 nm.

When the diameter of the carbon fiber (B') is smaller than 1 nm, the carbon fiber is dispersed too finely, and targeted antistatic properties cannot be provided. When the diameter is larger than 1 µm, dispersion becomes non-uniform, the effect of fusing the carbon fiber with the fibrous conductive filler (C) is not obtained, and targeted antistatic properties cannot be provided. When the length of the carbon fiber is smaller than 1 µm, the carbon fiber is dispersed too finely, and targeted antistatic properties cannot be provided. When the length is larger than 10 mm, dispersion becomes nonuniform, the effect of fusing the carbon fiber with the fibrous conductive filler (C) cannot be obtained, and targeted antistatic properties cannot be provided. When the volume resistivity of the carbon fiber is more than 1 Ωcm, the effect of fusing the fiber carbon with the fibrous conductive filler (C) cannot be obtained, and sufficient antistatic properties cannot be provided.

This carbon fiber (B') is preferably a vapor phase process carbon fiber produced by a vapor phase process. Methods for producing this vapor phase process carbon fiber include a substrate method (JP-A 60-27700) and a flotation method (JP-A 62-78217). Carbon fibers produced by these methods include a carbon fiber treated at a temperature higher than 2,000° C. These carbon fibers may be used in combination of two or more. The disclosures of JP-A 60-27700 and JP-A 62-78217 are cited herein as part of a description of the present invention.

The amount of the carbon fiber (B') used in the present invention is 1 to 30 parts by weight, preferably 1 to 10 parts by weight based on 100 parts by weight of the thermoplastic resin. When the amount is smaller than 1 part by weight, the effect of fusing the carbon fiber with the fibrous conductive filler (C) is not exhibited and the effect of leaking a charge is small. When the amount is larger than 30 parts by weight, extrusion ability, moldability and mechanical property are reduced. Further, costs are too high, which is not practical.

When a carbon fiber is used in the second composition of the present invention as the fibrous conductive filler, a carbon fiber having a diameter of more than 1 µm is preferably used to obtain the effect of fusing the carbon fiber with the carbon fiber (B') and improve the effect of leaking a charge.

As for what is not described of the third composition of the present invention herein, it should be understood that the description of the first composition is directly applied to the third composition of the present invention.

The third composition comprises both the polymer (B) and the carbon fiber (B'). In this case, the content of the polymer (B) is 0.01 to 150 parts by weight, preferably 1 to 50 parts by weight based on 100 parts by weight of the thermoplastic resin.

The carbon fiber (B') is used in an amount of 0.01 to 28 parts by weight, preferably 0.1 to 9 parts by weight based on the same standard.

The thermoplastic resin composition of the present invention (including the first, second and third compositions of the present invention hereinafter unless otherwise stated) may contain various additives including a release agent such as montan wax, polyethylene wax or silicon oil, flame retardant, flame retardant aid, thermal stabilizer, ultraviolet absorber, pigment and dye in limits not prejudicial to the object of the present invention. A thermoset resin such as a phenol resin, melamine resin, silicon resin or epoxy resin; or a soft thermoplastic resin such as ethylene/vinyl acetate copolymer, polyester elastomer or epoxy modified polyolefin may be added in limits not prejudicial to the object of the present invention. Other filler such as talc, kaolin, Wollastonite, clay, silica, sericite, titanium oxide, carbon black, graphite, metal powder, glass bead, glass balloon, glass flake, glass powder or glass fiber may be further added.

Composition Production Method

The thermoplastic resin composition used in the present invention is obtained by blending the components (A), (B) and/or (B') and (C) in accordance with a desired method. These components are generally preferably dispersed uniformly, all or part of these components are preferably dispersed uniformly at the same time, or all or part of these components are mixed together by a mixer such as a blender, kneader, banbury mixer, roll or extruder at the same time or separately to prepare a homogenous mixture.

Further, a dry blended composition may be molten and kneaded with a heated extruder to be made homogeneous and extruded into a wire form which is cut to a desired length to be granulated.

Carrier Jig For Use In Electronic Field

The thermoplastic resin composition of the present invention is suitable as a raw material for a carrier jig for use in the electronic field.

Illustrative examples of the carrier jig include silicone wafer carrier, silicone wafer carrier box, silicone wafer press bar, IC tray, carrier for liquid crystal base and carrier jig for HDD and LCD-related parts.

Therefore, according to the present invention, there is also provided a carrier jig for use in the electronic field which is made from the destaticizing thermoplastic resin composition of the present invention.

Stated more specifically, in the carrier jig of the present invention, differences (relationship among average values, minimum values and maximum values) in saturation voltage and voltage half-attenuation time when a surface area measuring 125 mm in length and 150 mm in width of the carrier jig is measured at an application voltage of 10 kV satisfy the following expressions at the same time.

$$E_{max} (V)-100 (V) \leq E_{ave} (V) \leq E_{min} (V)+100 (V)$$

$$T_{max} (s)-5 (s) \leq T_{ave} (s) \leq T_{min} (s)+5 (s)$$

wherein $E_{ave}$, $E_{max}$ and $E_{min}$ are average, maximum and minimum values of saturation voltage and $T_{ave}$, $T_{max}$ and $T_{min}$ are average, maximum and minimum values of voltage half-attenuation time, respectively.

The above expressions are established when a surface area measuring 125 mm in length and 150 mm in width to be measured is divided into 9 sections and each section is measured. The above expressions are established for the surface area to be measured, that is, a desired flat portion of the resin surface forming the carrier jig.

Owing to this feature, the adhesion of floating particles by static electricity can be greatly reduced over the entire surface of the carrier jig and poor outer appearance caused by the particles (so-called "lack of pattern") can be reduced.

Although there is a possibility that the above feature can be attained by using a large amount of carbon black or combining a non-carbon-based conductive agent or a carbon-based conductive agent, it is not preferred to use the carbon black or the agents in a carrier jig for use in the electronic field because waste carbon is produced at the time of molding or use.

The carrier jig of the present invention has antistatic properties and mechanical strength, that is, rigidity with a flexural modulus of 5,000 MPa or more which is required for a large carrier jig for use in the electronic field. Due to these physical properties, there can be obtained a silicon wafer carrier which has at least one groove for holding a wafer and can be incorporated into full automation, which will be required in the near future.

A combination of the fibrous conductive filler and the antistatic polymer described in the present invention can be applied in the field of electromagnetic shielding. A combination of a nickel coated carbon fiber and PEEA is such an example.

When the polymer (B) is used to produce a carrier jig for use in the electronic field which promotes the leakage of a charge and has small differences in saturation voltage and voltage half-attenuation time and excellent destaticizing properties, molding conditions for dispersing the polymer (B) in the form of a stripe or net in the surface portion of a molded product must be employed, that is, molding must be carried out at a higher speed and a higher voltage than when molding an ordinary polyester.

For instance, when the Mitsubishi 80 MSP injection molding machine is used, molding is preferably carried out at a cylinder temperature of 250° C., a mold temperature of 60° C. and an injection rate/injection pressure of 40 to 60%. The thus obtained carrier jig for use in the electronic field has excellent permanent antistatic properties.

The following examples are given to further illustrate the present invention.

Raw materials and evaluation methods used in the examples are as follows.

1. raw materials

The following raw materials were used.

polybutylene terephthalate (PBT): TRB-QK of Teijin Limited polystyrene (PS): Stylon 666 of Asahi Chemical Industry Co., Ltd.

acrylonitrile/butadiene/styrene copolymer (ABS): Stylac 101 of Asahi Chemical Industry Co., Ltd.

polycarbonate (PC): AD5509 of Teijin Kasei Co., Ltd.

polyether ester amide (PEEA): Pelestat 6321 of Sanyo Chemical Industries, Ltd. having a surface resistivity of $1 \times 10^9$ Ω and a melting point of 203° C.

high-molecular antistatic agent: SD100 of Mitsui Dupont Chemical Co., Ltd. having a surface resistivity of $1 \times 10^8$ Ω and a melting point of 92° C.

high-molecular antistatic agent: Leorex AS-170 of Daiichi Kogyo Seiyaku Co., Ltd. having a surface resistivity of $7 \times 10^6$ Ω and a melting point of 80° C.

polyether ester: TRB-EKV of Teijin Limited having a surface resistivity of $1 \times 10^{10}$ Ω and a melting point of 170° C.

sodium dodecylbenzenesulfonate (DBS-Na): TPL456 of Takemoto Yushi Co., Ltd.

carbon fiber (CF): HTA-C6-SR of Toyo Rayon Co., Ltd. having a volume resistivity of $1.5 \times 10^{-3}$ Ωcm, a diameter of 7 μm and a length of 6 mm nickel coated carbon fiber: MC(I)HTA-C6-SR of Toyo Rayon Co., Ltd. having a volume resistivity of $7.5 \times 10^{-5}$ Ωcm stainless fiber: Tafmic Fiber of Tokyo Seiko Co., Ltd. having a volume resistivity of $7.5 \times 10^{-5}$ Ωcm conductive potassium titanate whisker: Dentole WK300 of Ohtsuka Kagaku Co., Ltd. having a volume resistivity of 1 to 10 Ωcm, a diameter of 0.4 to 0.7μm, a length of 10 to 20 μm conductive potassium titanate whisker: Dentole WK200B of Ohtsuka Kagaku Co., Ltd. having a volume resistivity of 0.1 to 1 Ωcm needle-like conductive titanium oxide: FT1000 of Ishihara Sangyo Co., Ltd. having a volume resistivity of 10 to 15 Ωcm super fine vapor phase process carbon fiber (VGCF1): VGCF of Showa Denko K.K. having a volume resistivity of $1.0 \times 10^{-2}$ Ωcm, a diameter of 0.2 μm and a length of 20 μm super fine vapor phase process carbon fiber (VGCF2): Micrographite fibril BN1100 of Hypilion Katarisys Co., Ltd. having a volume resistivity of $1 \times 10^{-2}$ Ωcm, a diameter of 15 nm and a length of 10 to 20 μm 2. antistatic properties (resistivity, saturation voltage and voltage half-attenuation time):

Antistatic properties were evaluated based on saturation voltage measured at an application voltage of 10 kV using an Honest meter (Static H-0110 of Shishido Seidenki Co., Ltd.), voltage half-attenuation time and surface resistivity measured using a ultra-insulation resistance testor (SM-10E of Toa Denpa Kogyo Co., Ltd.).

Low resistivity was measured in accordance with JIS K7194.

The voltage half-attenuation time and the surface resistivity were measured at an ambient temperature of 23° C. and a relative humidity of 50% after a sample was kept at a temperature of 23° C. and a relative humidity of 50% for 24 hours.

To measure differences in saturation voltage and voltage half-attenuation time, a test piece (125×150 mm, thickness of about 5 mm) was divided into 9 small sections, each measuring about 41.7 mm in length×50 mm in width, and each of the sections was measured.

3. mechanical strength:

A tensile test was conducted in accordance with ASTM D638 and a flexural test was conducted in accordance with ASTM D790.

4. volume resistivity of fibrous conductive filler:

The volume resistivity was measured in accordance with JIS-R-7601. When this method was not used, a powder produced at a pressure of 100 kg/cm$^2$ was measured.

5. surface resistivity of antistatic polymer:

The surface resistivity was measured using a ultra-insulation resistance testor (SM-10E of Toa Denpa Kogyo Co., Ltd.) (measurement voltage of 500 V). This measurement was carried out at an ambient temperature of 23° C. and a relative humidity of 50% after a sample was kept at a temperature of 23° C. and a relative humidity of 50% for 24 hours.

6. melting point of antistatic polymer:

The melting point was measured by DSC (of T. A. Instrument Japan Co., Ltd.).

7. melt viscosity ratio:

The melt viscosity ratio is defined by the following expression.

(melt viscosity ratio)=(melt viscosity of antistatic polymer)/(melt viscosity of thermoplastic resin such as PBT)

The measurement conditions include a temperature of 260° C. and a shear rate of 1,000 sec$^{-1}$. Leograph 2002 of Getfelt of Germany was used to measure melt viscosity.

8. washing:

The surface of a sample was manually washed with sponge for 3 minutes using a neutral detergent (1.5 ml/l of aqueous solution of Mama Lemon) and then with hot purified water (60° C.) for 3 minutes, dried with an air blow and in an oven at 80° C. for 10 minutes and kept at a temperature of 23° C. and a relative humidity of 50% for 24 hours.

EXAMPLES 1 TO 13 AND COMPARATIVE EXAMPLES 1 TO 20

The above raw materials were dry blended uniformly in a weight ratio shown in Tables 2, 4 and 5, molten and kneaded at a cylinder temperature of 180 to 310° C., a screw revolution speed of 160 rpm and a discharge rate of 40 kg/h using a vented double-screw extruder having a screw diameter of 44 mm, and a thread discharged from a dice was cooled and cut to obtain a pellet for molding.

A silicon wafer carrier and a test piece for the evaluation of mechanical properties were formed from this pellet by injection molding under conditions including an injection pressure of 750 kg/cm$^2$, an injection rate of 70 cm$^3$/sec, a cooling time of 15 sec and a total molding cycle of 25 sec. Further, the side portion of this silicon wafer carrier was cut to a desired size to carry out the above evaluation.

The antistatic agents used are shown in Table 1, out of which, high-molecular antistatic agents which can produce an effect when they are applied in PBT, that is, have high heat stability and can be dispersed in PBT in the form of a net or stripe are PEEA and TRB-EKV.

Further, The evaluation results are shown in Table 2.

TABLE 1

| antistatic polymer | melt viscosity at 260° C. and 1,000 sec$^{-1}$ (PA·S) | melt viscosity ratio to TRB-QK | melting point (° C.) |
|---|---|---|---|
| PEEA | 56 | 0.30 | 203 |
| TRB-EKV | 54 | 0.30 | 171 |
| SD100 | 236 | 1.32 | 92 |
| Leorex SD-170 | could not be measured due to increased viscosity | 1.32 or more | 80 |

TABLE 2

| | Composition (wt %) | | | | | untreated | | | | |
|---|---|---|---|---|---|---|---|---|---|---|
| | PBT | PEEA | SD100 | Leorex | CF (HTAC 6SR) | Ω/□* | saturation voltage (KV) | voltage half-attenuation time (sec) | tensile strength (MPa) | flexural strength (MPa) | elastic modulus (MPa) |
| Ex. 1 | 77 | 15 | | | 8 | 1E9 | 0.03 | 1.7 | 73 | 90 | 5200 |
| Ex. 2 | 79 | 15 | | | 6 | 1E9 | 0.07 | 3 | 63 | 82 | 4400 |
| C.Ex. 1 | 85 | 15 | | | | 4E12 | 1.5 | 3 | 44 | 65 | 1900 |
| C.Ex. 2 | 96 | | | | 4 | 3E16 | 1.3 | 300 or more | 82 | 125 | 4300 |
| C.Ex. 3 | 94 | | | | 6 | 2E14 | 0.7 | 300 or more | 95 | 145 | 5200 |
| C.Ex. 4 | 92 | | | | 8 | 1E14 | 0.5 | 300 or more | 113 | 170 | 6600 |
| C.Ex. 5 | 85 | | 15 | | | 4.8E13 | 1.19 | 300 or more | — | 36 | 2200 |
| C.Ex. 6 | 85 | | | 15 | | 4.9E13 | 1.18 | 300 or more | 46 | 66 | 2000 |
| C.Ex. 7 | 80 | | 10 | | 10 | 1.4E9 | 0.24 | 300 or more | 66 | 89 | 7600 |
| C.Ex. 8 | 70 | | 10 | | 20 | 1.6E9 | 0.07 | 240 | 79 | 110 | 12400 |
| C.Ex. 9 | 70 | | | 15 | 15 | 2.0E4 | 0.12 | 213 | 91 | 120 | 8600 |
| C.Ex. 10 | 70 | | | 10 | 20 | 2.9 | 0.11 | 177 | 102 | 135 | 11200 |
| C.Ex. 11 | 70 | | | | 30 | 28 | 0.05 | 28 | 172 | 260 | 17100 |
| C.Ex. 12 | 80 | 20 | | | | 3.3E12 | 1.4 | 1.9 | 42 | 60 | 2000 |
| C.Ex. 13 | 70 | 30 | | | | could not be produced | | | | | |

Note) *For example. "1E9" means 1 × 10$^9$ (This shall apply hereinafter).

As is evident from Table 2, in compositions comprising PEEA and CF (Examples 1 and 2), the effect of fusing PEEA with carbon fiber is exhibited markedly, the saturation voltage is 1 kV or less, and the voltage half-attenuation time is 10 sec or less.

In contrast, in compositions comprising Leorex and CF (Comparative Examples 9 and 10) and compositions comprising SD100 and CF (Comparative Examples 7 and 8), antistatic properties are insufficient.

In compositions comprising an antistatic polymer and no CF (Comparative Examples 1, 5, 6, 12 and 13) and composition comprising CF and no antistatic polymer (Comparative Examples 2, 3, 4 and 11), the saturation voltage could not be reduced to 1 kV or less and the voltage half-attenuation time could not be reduced to 10 sec or less even by increasing the content of the antistatic polymer or CF.

Since the composition of Comparative Example 1 has a surface resistivity of $10^{12}$ Ω or more, a saturation voltage of 1 kV or more and a flexural modulus of 2,000 MPa or less, it is not suitable for use as a large carrier jig which requires high rigidity.

Although the compositions of Comparative Examples 2 to 4 have a flexural modulus of 4,000 to 6,000 MPa, they have a voltage half-attenuation time of 300 sec or more and may have a problem with antistatic properties as a large carrier jig.

The compositions comprising PEEA and carbon fiber of Examples 1 and 2 have antistatic properties as a carrier jig for use in the electronic field and high rigidity for a large carrier jig.

Differences in antistatic properties, saturation voltage and voltage half-attenuation time, on molded products of Example 1, Comparative Example 1, Comparative Example 4 and Comparative Example 11 have been studied.

The side portion (125×150 mm, thickness of about 5 mm) of a molded silicon wafer carrier was equally divided into 9 small sections, each measuring about 41.7 mm in length×50 mm in width, as shown in FIG. 1 and the saturation voltage and voltage half-attenuation time of each section were measured to study differences in saturation voltage and voltage half-attentuation time.

Table 3 shows differences in saturation voltage and voltage half-attenuation time.

As is evident from Table 3, in the composition comprising PEEA and CF of Example 1, differences in voltage half-attenuation time and saturation voltage are smaller than those of the composition comprising CF and no antistatic polymer of Comparative Example 4.

It is understood that differences in voltage half-attenuation time and saturation voltage on the flat plate of the composition comprising CF and PEEA of Example 1 are smaller and antistatic properties are more uniformly provided than those of the composition comprising PEEA and no CF of Comparative Example 1.

Further, in the composition comprising CF and no antistatic polymer of Comparative Example 11 which has the total of volume fractions of PEEA and CF, the initial saturation voltage can be reduced but the voltage half-attenuation time cannot be reduced and differences cannot be eliminated.

Thus, the composition of the present invention can reduce differences in antistatic properties on the surface of a molded product.

The antistatic properties of a carrier jig for use in the electronic field must not be changed by washing and temperature variations at the time of transportation. Changes in antistatic properties at the time of washing and annealing were measured. The results are shown in Table 4.

TABLE 3

| | C.Ex. 1 | | C.Ex. 4 | | C.Ex. 11 | | Ex. 1 | |
|---|---|---|---|---|---|---|---|---|
| divided portion | saturation voltage (V) | voltage half-attenuation time (sec) | saturation voltage (V) | voltage half-attenuation time (sec) | saturation voltage (V) | voltage half-attenuation time (sec) | saturation voltage (V) | voltage half-attenuation time (sec) |
| 1 | 660 | 0.7 | 480 | saturation | 50 | 26 | 0 | 0.0 |
| 2 | 740 | 1.0 | 450 | voltage | 40 | 57 | 0 | 0.0 |
| 3 | 680 | 0.8 | 500 | on the | 50 | 25 | 0 | 0.0 |
| 4 | 510 | 0.5 | 590 | left is | 50 | 28 | 30 | 0.1 |
| 5 | 690 | 1.7 | 430 | kept and | 40 | 54 | 0 | 0.0 |
| 6 | 480 | 0.5 | 580 | does not | 50 | 23 | 30 | 0.1 |
| 7 | 820 | 1.4 | 640 | attenuate | 50 | 21 | 50 | 0.4 |
| 8 | 960 | 2.7 | 420 | >300 | 20 | 6 | 20 | 0.1 |
| 9 | 1050 | 4.0 | 580 | | 40 | 19 | 50 | 0.4 |

TABLE 4

| | Composition (wt %) | | | | | untreated | | 160° C. × 5 hours | | water treatment | |
|---|---|---|---|---|---|---|---|---|---|---|---|
| | QK | PEEA | TRB EKV | DBS-Na | HTAC 6SR | saturation voltage (KV) | voltage half-attenuation time (sec) | saturation voltage (KV) | voltage half-attenuation time (sec) | saturation voltage (KV) | voltage half-attenuation time (sec) |
| Ex. 3 | 50 | | 40 | | 10 | 0 | 0 | 0 | 0 | 0 | 0 |
| Ex. 4 | 30 | 60 | | | 10 | 0 | 0 | 0 | 0 | 0 | 0 |
| Ex. 5 | 47 | | 7 | | 46 | 0 | 0 | 0 | 0 | 0 | 0 |
| Ex. 6 | 25 | | 50 | | 25 | 0 | 0 | 0 | 0 | 0 | 0 |
| C.Ex. 14 | 80 | | | 5 | 15 | 0 | 1 | 0.02 | 3.7 | 0.11 | 396 |
| C.Ex. 15 | 75 | | | 5 | 20 | 0.03 | 0.82 | 0.03 | 0.60 | 0.06 | 92 |

TABLE 4-continued

| | Composition (wt %) | | | | | untreated | | 160° C. × 5 hours | | water treatment | |
|---|---|---|---|---|---|---|---|---|---|---|---|
| | QK | PEEA | TRB EKV | DBS- Na | HTAC 6SR | saturation voltage (KV) | voltage half- attenuation time (sec) | saturation voltage (KV) | voltage half- attenuation time (sec) | saturation voltage (KV) | voltage half- attenuation time (sec) |
| C.Ex. 16 | 75 | | | 10 | 15 | 0 | 0 | 0.01 | 1.87 | 0.06 | 307 |
| C.Ex. 17 | 50 | | | 40 | 10 | | | could not be produced | | | |

As means of reducing saturation voltage and voltage half-reduction time, a combination of a conductive filler and a low-molecular antistatic agent is used (Comparative Examples 14 to 17). However, as is obvious from Table 4, according to this method, antistatic properties are greatly deteriorated by 5 hours of annealing at 160° C. and washing.

In contrast, a carrier jig for use in the electronic field made from the composition of the present invention (Examples 3 to 6) does not suffer from deterioration in characteristic properties and has permanent antistatic properties.

The results obtained when a conductive filler other than CF (HTA-C6-SR) was compounded are shown in Table 5.

Like carbon fiber shown in Table 2, when only a conductive filler is used, both the voltage half-attenuation time and saturation voltage cannot be reduced (Comparative Examples 18 to 20).

EXAMPLES 14 TO 22 AND COMPARATIVE EXAMPLES 21 TO 25

The antistatic agents used are shown in Table 6. Of these, high-molecular antistatic agents which can produce an effect when they are applied in thermoplastic resins other than

TABLE 5

| | Composition (wt %) | | | | | | | | untreated | | 160° C. × 5 hours | |
|---|---|---|---|---|---|---|---|---|---|---|---|---|
| | QK | CF | CF MC (1) | stainless steel | wk 300 | wk 200B | FT 1000 | PEEA | Ω/□ | saturation voltage (KV) | voltage half- attenuation time (sec) | saturation voltage (KV) | voltage half- attenuation time (sec) |
| Ex. 7 | 70 | 10 | | | | | | 20 | 1.0E3 | 0 | 0 | 0 | 0 |
| Ex. 8 | 70 | | 10 | | | | | 20 | 1.3E13 | 0.05 | 0.47 | 0 | 0 |
| Ex. 9 | 72 | | | 8 | | | | 20 | 4.3E11 | 0.62 | 0.52 | 0.66 | 0.52 |
| Ex. 10 | 70 | | | | 10 | | | 20 | 2.1E11 | 0.48 | 0.29 | 0.32 | 0.19 |
| Ex. 11 | 70 | | | | | 10 | | 20 | 1.7E11 | 0.42 | 0.28 | 0.30 | 0.20 |
| Ex. 12 | 70 | | | | | | 10 | 20 | 4.1E11 | 0.58 | 0.44 | 0.55 | 0.40 |
| Ex. 13 | 60 | 30 | | | | | | 10 | 2.7E10 | 0.03 | 0.74 | 0.01 | 0.098 |
| C.Ex. 18 | 70 | 30 | | | | | | | 7.6E10 | 0.15 | 129 | 0.19 | 240 |
| C.Ex. 19 | 90 | | | | 10 | | | | 4.2E13 | 1.26 | >300 | 1.25 | >300 |
| C.Ex. 20 | 70 | | | | 30 | | | | could not be produced | | | | |

The same effect is observed when nickel coated carbon fiber, stainless fiber and various whiskers shown in Table 5 are used (Examples 7 to 13).

PBT, that is, have high heat stability and can be dispersed in thermoplastic resins in the form of a net or stripe are PEEA and TRB-EKV.

TABLE 6

| Antistatic polymer | Melt viscosity at 260° C. and 1,000 sec$^{-1}$ (PA·S) | Melt viscosity ratio to PS | Melt viscosity ratio to ABS | Melting point (° C.) |
|---|---|---|---|---|
| PEEA | 56 | 0.82 | 0.34 | 203 |
| TRB-EKV | 54 | 0.79 | 0.32 | 171 |
| Leorex SD-170 | Could not be measured due to increased viscosity | 1.30 or more | 1.30 or more | 80 |

Various components were mixed in a weight ratio specified In Table 7, Table 9 and Table 10, and the resulting mixtures were evaluated In the same manner as in Examples 1 to 13.

Table 7 shows the evaluation results.

TABLE 7

|  | Composition (wt %) | | | | | untreated | | |
|---|---|---|---|---|---|---|---|---|
|  | PS | ABS | PEEA | Leorex | CF (HTAC 6SR) | $\Omega/\square$ | saturation voltage (KV) | voltage half-attenuation time (sec) |
| Ex. 14 | 77 |  | 15 |  | 8 | 5E + 8 | 0.02 | 0.13 |
| Ex. 15 |  | 77 | 15 |  | 8 | 2E + 3 | 0.03 | 0.66 |
| C.Ex. 21 |  | 70 |  | 20 | 10 | 3E + 2 | 0.16 | 200 |
| C.Ex. 22 |  | 70 |  |  | 30 | 2E + 9 | 0.10 | >600 |

As is evident from Table 7, in the compositions comprising PEEA and CF of Examples 14 and 15, the effect of fusing PEEA with carbon fiber is exhibited markedly, the saturation voltage is 1 kV or less, and the voltage half-attenuation time is 10 sec or less.

In contrast, in the composition comprising Leorex and CF of Comparative Example 21, antistatic properties are insufficient.

In the composition comprising CF and no antistatic polymer of Comparative Example 22, the saturation voltage cannot be reduced to 1 kV or less and the voltage half-attenuation time cannot be reduced to 10 sec or less simply by increasing the content of CF.

The compositions comprising PEEA and carbon fiber of Examples 14 and 15 show a flexural strength of 70 MPa and a flexural modulus of 4,300 MPa and have antistatic properties as a carrier jig for use in the electronic field and high rigidity required for a large carrier jig.

Differences in antistatic properties, that is, saturation voltage and voltage half-attenuation time, on the surfaces of molded products of Examples 15 and Comparative Example 22 were studied.

The side portion (125×150 mm, thickness of about 5 mm) of a molded silicon wafer carrier was equally divided into 9 small sections, each measuring about 41.7 mm in length×50 mm in width, as shown in FIG. 1 and the saturation voltage and voltage half-attenuation time of each section were measured to study differences in saturation voltage and voltage half-attenuation time.

Table 8 shows differences in saturation voltage and voltage half-attenuation time.

TABLE 8

|  | Ex.15 | | C.Ex.22 | |
|---|---|---|---|---|
| divided portion | saturation voltage (V) | voltage half-attenuation time (sec) | saturation voltage (V) | voltage half-attenuation time (sec) |
| 1 | 10 | 0.16 | 80 | saturation |
| 2 | 0 | 0.00 | 40 | voltage |
| 3 | 20 | 0.16 | 60 | on the |
| 4 | 20 | 0.13 | 60 | left is |
| 5 | 0 | 0.00 | 30 | kept and |
| 6 | 20 | 0.26 | 50 | does not |
| 7 | 20 | 0.20 | 40 | attenuate |
| 8 | 0 | 0.00 | 30 |  |
| 9 | 10 | 0.19 | 50 |  |

As is evident from Table 8, in the composition comprising CF and no antistatic polymer and having the total of volume fractions of PEEA and CF of Comparative Example 22, the initial saturation voltage can be reduced but the voltage half-attenuation time cannot be shortened and differences cannot be eliminated.

Thus, the composition of the present invention can eliminate differences in antistatic properties on the surface of a molded product.

The antistatic properties of a carrier jig for use in the electronic field must not be changed by washing and temperature variations at the time of transportation. Then, changes in antistatic properties at the time of washing and annealing were measured. The results are shown in Table 9.

TABLE 9

| | Composition(wt %) | | | | untreated | | washing | |
| | | | | | saturation voltage (KV) | voltage half-attenuation time (sec) | saturation voltage (KV) | voltage half-attenuation time (sec) |
|---|---|---|---|---|---|---|---|---|
| | PS | ABS | TRB EKV | DBS-Na | HTAC6 SR | | | | |

| | PS | ABS | TRB EKV | DBS-Na | HTAC6 SR | voltage (KV) | time (sec) | voltage (KV) | time (sec) |
|---|---|---|---|---|---|---|---|---|---|
| Ex.16 | | 50 | 40 | | 10 | 0 | 0 | 0 | 0 |
| Ex.17 | 30 | | 60 | | 10 | 0 | 0 | 0 | 0 |
| Ex.18 | 47 | | 7 | | 46 | 0 | 0 | 0 | 0 |
| Ex.19 | | 25 | 50 | | 25 | 0 | 0 | 0 | 0 |
| C.Ex.23 | 75 | | | 5 | 20 | 0 | 0 | 0.03 | 4 |
| C.Ex.24 | 75 | | | 10 | 15 | 0 | 0 | 0.02 | 0.4 |

As means of reducing saturation voltage and voltage half-attenuation time, a combination of a conductive filler and a low-molecular antistatic agent is used (Comparative Examples 23 and 24). However, as is evident from Table 9, according to this method, antistatic properties are greatly reduced by washing.

In contrast, a carrier jig for use in the electronic field made from the composition of the present invention (Examples 16 to 19) does not suffer from deterioration in characteristic properties by the same treatment and has permanent antistatic properties. The compositions of Examples 16 to 19 do not change in characteristic properties after 5 hours of annealing at 160° C.

The evaluation results of the compositions comprising conductive fillers other than CF (HTA-C6-SR) are shown in Table 10.

TABLE 10

| | composition | | | | | saturation voltage (KV) | voltage half-attenuation time (sec) |
|---|---|---|---|---|---|---|---|
| | PS | ABS | stainless fiber | WK200B | nickel coated carbon fiber | PEEA | | |
| Ex.20 | 72 | | 8 | | | 20 | 0.17 | 0.30 |
| Ex.21 | 70 | | | 10 | | 20 | 0.12 | 0.32 |
| Ex.22 | | 70 | | | 10 | 20 | 0.01 | 0.12 |
| C.Ex.25 | | 70 | | | 30 | | 0.42 | >600 |

The same effect is observed when nickel coated carbon fiber, stainless fiber and various whiskers shown in Table 10 are used (Examples 20 to 22).

Like carbon fiber shown in Table 2, when only a conductive filler is used, both voltage half-attenuation time and saturation voltage cannot be reduced (Comparative Example 25).

EXAMPLES 23 TO 26 AND COMPARATIVE EXAMPLES 26 AND 27

Various components were mixed in a weight ratio specified in Table 11 and Table 12, and the resulting mixtures were evaluated in the same manner as in Examples 1 to 13.

The evaluation results are shown in Table 11.

TABLE 11

| | Ex.23 | C.Ex.26 |
|---|---|---|
| [composition(wt %)] | | |
| PBT | 85 | 84 |
| CF | 8.5 | 6 |
| VGCF 1 | 6.5 | — |
| Dentole WK300 | — | 10 |
| surface resistivity(Ω) | 2.0E + 9 | 5.0E + 13 |

As shown in Table 11, in the composition comprising CF and VGCF1 of Example 23, the surface resistivity can be controlled to an antistatic level by the effect of fusing two different types of fibers whereas in the composition comprising Dentole WK300 and CF of Comparative Example 26, the fusion effect is hardly seen.

TABLE 12

| | Ex.24 | Ex.25 | Ex.26 | C.Ex.27 |
|---|---|---|---|---|
| [composition(wt %)] | | | | |
| PBT | 87.5 | — | 77.5 | 70 |
| PC | — | 87.5 | — | — |
| CF | 8.5 | 8.5 | 8.5 | 30 |
| VGCF 2 | 4 | 4 | 4 | — |
| TRB-EKV | — | — | 10 | — |
| surface resistivity(Ω) | 1.3E + 9 | 5.3E + 5 | 2.9E + 8 | 28 |
| saturation voltage(KV) | <0.01 | <0.01 | 0 | 0.05 |
| voltage half-attenuation time(sec) | <0.1 | <0.1 | 0 | 28 |
| flexural modulus (MPa) | 7400 | 6800 | — | — |

As is seen from Table 12, in the compositions comprising CF and VGCF2 of Examples 24 and 25, the effect of fusing CF with VGCF2 is exhibited markedly, the saturation voltage is 1 kV or less, and the voltage half-attenuation time is 10 sec or less. In the composition comprising TRB-EKV of Example 26, the leakage of a charge is promoted more effectively. In contrast, when the content of CF is simply increased (Comparative Example 27), the voltage half-attenuation time cannot be reduced to 10 sec or less and a molded product of the composition is inferior in destaticizing properties.

The compositions comprising CF and VGCF2 of Examples 24 and 25 have antistatic properties as a carrier jig for use in the electronic field and high rigidity required for a large carrier jig.

Thus, the composition of the present invention can reduce differences in antistatic properties on the surface of a molded product.

EXAMPLES 27 AND 28 AND COMPARATIVE EXAMPLES 28 TO 31

Various components were mixed in a weight ratio specified in Table 14, and the resulting mixtures were evaluated in the same manner as in Examples 1 to 13.

The results are shown in Table 14.

TABLE 14

|  | Ex.27 | Ex.28 | C.Ex.28 | C.Ex.29 | C.Ex.30 | C.Ex.31 |
|---|---|---|---|---|---|---|
| Composition(wt %) |  |  |  |  |  |  |
| TRB-QK | 77 | 79 | 85 | 96 | 94 | 92 |
| Pelestat 6321 | 15 | 15 | 15 | 0 | 0 | 0 |
| HTA-C6-SR | 8 | 6 | 0 | 4 | 6 | 8 |
| surface resistivity($\Omega$) | 1E + 9 | 1E + 9 | 4E + 12 | 3E + 16 | 2E + 14 | 1E + 14 |
| saturation voltage(KV) | 0.03 | 0.07 | 1.5 | 1.3 | 0.7 | 0.5 |
| voltage half-attenuation time(sec) | 1.7 | 3 | 3 | 300< | 300< | 300< |
| tensile strength(MPa) | 73 | 63 | 44 | 82 | 95 | 113 |
| flexural strength(MPa) | 90 | 82 | 65 | 125 | 145 | 170 |
| flexural modulus(MPa) | 5200 | 4400 | 1900 | 4300 | 5200 | 6600 |

Differences in antistatic properties, saturation voltage and voltage half-attenuation time, on molded products of Examples 24 and Comparative Example 27 have been studied.

The side portion (125×150 mm, thickness of about 5 mm) of a molded silicon wafer carrier was equally divided into 9 small sections, each measuring about 41 mm in length× about 50 mm in width, as shown in FIG. 1 and the saturation voltage and voltage half-attenuation time of each section were measured to study differences in saturation voltage and voltage half-attenuation time.

Table 13 shows differences in saturation voltage and voltage half-attenuation time.

TABLE 13

|  | Ex.24 | | C.Ex.27 | |
|---|---|---|---|---|
| divided portion | saturation voltage (V) | voltage half-attenuation time (sec) | saturation voltage (V) | voltage half-attenuation time (sec) |
| 1 | 0 | 0.0 | 50 | 26 |
| 2 | 0 | 0.0 | 40 | 57 |
| 3 | 0 | 0.0 | 50 | 25 |
| 4 | 10 | 0.1 | 50 | 28 |
| 5 | 0 | 0.0 | 40 | 54 |
| 6 | 10 | 0.1 | 50 | 23 |
| 7 | 10 | 0.1 | 50 | 21 |
| 8 | 0 | 0.1 | 20 | 6 |
| 9 | 10 | 0.1 | 40 | 19 |

As is obvious from Table 13, in the composition comprising CF and VGCF2 of Example 24, differences in saturation voltage and voltage half-attenuation time are much smaller than those of the composition comprising CF and no antistatic polymer of Comparative Example 27.

Although the composition of Comparative Example 28 has a surface resistivity of $10^{12}$ $\Omega$ less and a voltage half-attenuation time of 5 sec or less and has antistatic properties, it has a flexural modulus of 2,000 MPa or less and hence, not suitable for use in a large carrier which requires high rigidity. On the other hand, the compositions of Comparative Examples 29 to 31 have a flexural modulus of 4,000 to 6,000 MPa and a voltage half-attenuation time of 300 sec or more. Therefore, it is possible that a large silicon wafer carrier made therefrom will have a problem with antistatic properties.

The compositions comprising PEEA and carbon fiber of Examples 27 and 28 have antistatic properties as a large silicon wafer carrier and high rigidity required for a large carrier. Especially, the voltage half-attenuation time is greatly reduced by the effect of fusing PEEA with carbon fiber, and the composition of Example 27 has a voltage half-attenuation time of the level of 1 sec.

Differences in antistatic properties on molded products of Example 27 and Comparative Examples 28 and 31 have been studied based on voltage half-attenuation time. Table 15 shows the distribution of voltage half-attenuation times of 9 sections obtained by dividing the side portion (125×150 mm, thickness of about 5 mm) of a molded silicon wafer carrier as shown in FIG. 1.

TABLE 15

|  | C.Ex.28 voltage half-attenuation time (sec) | C.Ex.31 voltage half-attenuation time (sec) | Ex.27 voltage half-attenuation time (sec) |
|---|---|---|---|
| divided portion |  |  |  |
| 1 | 0.7 | 300 | 0.0 |
| 2 | 1.0 | 300 | 0.0 |
| 3 | 0.8 | 300 | 0.0 |
| 4 | 0.5 | 300 | 0.1 |

TABLE 15-continued

| divided portion | C.Ex.28 voltage half-attenuation time (sec) | C.Ex.31 voltage half-attenuation time (sec) | Ex.27 voltage half-attenuation time (sec) |
|---|---|---|---|
| 5 | 1.7 | 300 | 0.0 |
| 6 | 0.5 | 300 | 0.1 |
| 7 | 1.4 | 300 | 0.4 |
| 8 | 2.7 | 300 | 0.1 |
| 9 | 4.0 | 300 | 0.4 |

The composition comprising PEEA and CF (Ex.27) has a much shorter voltage half-attenuation time than that of the composition comprising CF and no antistatic polymer (C.Ex.31) and smaller differences (Ex.27) in voltage half-attenuation time on a flat plate than those of the composition comprising PEEA and no CF (C.Ex.28). Therefore, it is understood that antistatic properties are provided more uniformly.

Thus, the composition comprising PEEA and CF is very useful as a raw material for a silicon wafer carrier.

What is claimed is:

1. A destaticizing thermoplastic resin composition comprising:
   (A) 100 parts by weight of a thermoplastic resin;
   (B) 10 to 200 parts by weight of a polymer having a surface resistivity measured at 500 V of $10^8$ to $10^{11}$ Ω, a melting point of 100° C. or higher, an apparent melt viscosity at an apparent shear rate at 260° C. of 1,000 $sec^{-1}$ of 10 to 1,000 Pa·s, and a ratio of the above apparent melt viscosity to the apparent melt viscosity of the thermoplastic resin at an apparent shear rate at 260° C. of 1,000 $sec^{-1}$ of 0.01 to 1.3; and
   (C) 1 to 100 parts by weight of a fibrous conductive filler having a volume resistivity of 100 Ω·cm or less,
   wherein the polymer (B) is at least one polymer selected from the group consisting of polyethylene glycol polyamide copolymers, polyethylene glycol methacrylate copolymers, poly(ethylene oxide/propylene oxide) copolymers, polyethylene glycol polyesteramide copolymers, polyethylene glycol polyester elastomers, poly(epichlorohydrin/ethylene oxide) copolymers and polyetheresteramides derived from ethylene oxide adduct of a bisphenol with a polyamide having a carboxyl group at both terminals.

2. The composition of claim 1, wherein the thermoplastic resin (A) is selected from the group consisting of a polymer comprising structural units derived from at least one monomer selected from the group consisting of styrenes, (meth)acrylate esters, (meth)acrylonitrile and butadiene, polyolefins, polyesters, polycarbonates, acryl resins, thermoplastic polyurethanes, polyvinyl chlorides, fluororesins, polyamides, polyacetals, polysulfones and polyphenylene sulfide.

3. The composition of claim 1, wherein the thermoplastic resin (A) is selected from the group consisting of polybutylene terephthalate, polypropylene terephthalate, polyethylene terephthalate, polybutylene-2,6-naphthalenedicarboxylate and polyethylene-2,6-naphthalenedicarboxylate.

4. The composition of claim 1, wherein the fibrous conductive filler (C) is at least one member selected from the group consisting of carbon fibers, metal fibers, metal whiskers, ceramic whiskers and organic polymer whiskers.

5. The composition of claim 4, wherein the fibrous conductive filler (C) is a carbon fiber, and the carbon fiber is an uncoated carbon fiber and/or nickel coated carbon fiber.

6. The composition of claim 4, wherein the fibrous conductive filler (C) is a metal fiber, and the metal fiber is produced by a method selected from the group consisting of a wire drawing method, a melt extrusion method, a melt extraction method, a cutting method and a plating method and made from at least one metal selected from the group consisting of Fe, Ni, Cu, Al, Pb, SUS (chromium steel) and Zn.

7. A destaticizing resin composition comprising:
   (A) 100 parts by weight of a thermoplastic resin;
   (B') 1 to 30 parts by weight of a carbon fiber having a diameter of 1 nm to 1 μm, a length of 1 μm to 10 mm and a volume resistivity of less than 1 Ωcm; and
   (C) 1 to 100 parts by weight of a fibrous conductive filler having a volume resistivity of 100 Ωcm or less.

8. The composition of claim 7, wherein the thermoplastic resin (A) is selected from the group consisting of a polymer comprising structural units derived from at least one monomer selected from the group consisting of styrenes, (meth)acrylate esters, (meth)acrylonitrile and butadiene, polyolefins, polyesters, polycarbonates, acryl resins, thermoplastic polyurethanes, polyvinyl chlorides, fluororesins, polyamides, polyacetals, polysulfones and polyphenylene sulfide.

9. The composition of claim 7, wherein the thermoplastic resin (A) is selected from the group consisting of polybutylene terephthalate, polypropylene terephthalate, polyethylene terephthalate, polybutylene-2,6-naphthalenedicarboxylate and polyethylene-2,6-naphthalenedicarboxylate.

10. The composition of claim 7, wherein the fibrous conductive filler (C) is at least one member selected from the group consisting of carbon fibers, metal fibers, metal whiskers, ceramic whiskers and organic polymer whiskers.

11. The composition of claim 10, wherein the fibrous conductive filler (C) is a carbon fiber, and the carbon fiber is an uncoated carbon fiber and/or nickel coated carbon fiber.

12. The composition of claim 10, wherein the fibrous conductive filler (C) is a metal fiber, and the metal fiber is produced by a method selected from the group consisting of a wire drawing method, a melt extrusion method, a melt extraction method, a cutting method and a plating method and made from at least one metal selected from the group consisting of Fe, Ni, Cu, Al, Pb, SUS (chromium steel) and Zn.

13. A destaticizing resin composition comprising:
   (A) 100 parts by weight of a thermoplastic resin;
   (B) 0.01 to 150 parts by weight of a polymer having a surface resistivity measured at 500 V of $10^8$ to $10^{11}$ Ω, a melting point of 100° C. or higher, an apparent melt viscosity at an apparent shear rate at 260° C. of 1,000 $sec^{-1}$ of 10 to 1,000 Pa·s, and a ratio of the above apparent melt viscosity to the apparent melt viscosity of the thermoplastic resin at an apparent shear rate at 260° C. of 1,000 $sec^{-1}$ of 0.01 to 1.3; and
   (B') 0.01 to 28 parts by weight of a carbon fiber having a diameter of 1 nm to 1 μm, a length of 1 μm to 10 mm and a volume resistivity of less than 1 Ωcm; and
   (C) 1 to 100 parts by weight of a fibrous conductive filler having a volume resistivity of 100 Ωcm or less,
   wherein the polymer (B) is at least one polymer selected from the group consisting of polyethylene glycol polyamide copolymers, polyethylene glycol methacrylate copolymers, poly(ethylene oxide/propylene oxide) copolymers, polyethylene glycol polyesteramide copolymers, polyethylene glycol polyester elastomers, poly(epichlorohydrin/ethylene oxide) copolymers and polyetheresteramides derived from ethylene oxide adduct of a bisphenol with a polyamide having a carboxyl group at both terminals.

14. The composition of claim 13, wherein the thermoplastic resin (A) is selected from the group consisting of a polymer comprising structural units derived from at least one monomer selected from the group consisting of styrenes, (meth)acrylate esters, (meth)acrylonitrile and butadiene, polyolefins, polyesters, polycarbonates, acryl resins, thermoplastic polyurethanes, polyvinyl chlorides, fluororesins, polyamides, polyacetals, polysulfones and polyphenylene sulfide.

15. The composition of claim 13, wherein the thermoplastic resin (A) is selected from the group consisting of polybutylene terephthalate, polypropylene terephthalate, polyethylene terephthalate, polybutylene-2,6-naphthalenedicarboxylate and polyethylene-2,6-naphthalenedicarboxylate.

16. The composition of claim 13, wherein the fibrous conductive filler (C) is at least one member selected from the group consisting of carbon fibers, metal fibers, metal whiskers, ceramic whiskers and organic polymer whiskers.

17. The composition of claim 16, wherein the fibrous conductive filler (C) is a carbon fiber, and the carbon fiber is an uncoated carbon fiber and/or nickel coated carbon fiber.

18. The composition of claim 16, wherein the fibrous conductive filler (C) is a metal fiber, and the metal fiber is produced by a method selected from the group consisting of a wire drawing method, a melt extrusion method, a melt extraction method, a cutting method and a plating method and made from at least one metal selected from the group consisting of Fe, Ni, Cu, Al, Pb, SUS (chromium steel) and Zn.

19. A carrier jig for use in an electronic field which is made from the destaticizing thermoplastic resin composition of claim 1.

20. The carrier jig of claim 19, wherein differences (relationship among average values, minimum values and maximum values) in saturation voltage and voltage half-attenuation time when an arbitrary surface area measuring 125 mm in length and 150 mm in width of the carrier jig is measured at an application voltage of 10 kV satisfy the following expressions at the same time, $$E_{max} (V) - 100 (V) \leq E_{ave} (V) \leq E_{min} (V) + 100 (V)$$

$$T_{max} (s) - 5 (s) \leq T_{ave} (s) \leq T_{min} (s) + 5 (s)$$

wherein $E_{ave}$, $E_{max}$ and $E_{min}$ are average, maximum and minimum values of saturation voltage and $T_{ave}$, $T_{max}$ and $T_{min}$ are average, maximum and minimum values of voltage half-attenuation time, respectively.

21. The carrier jig of claim 20, wherein the surface area to be measured is an arbitrary flat portion of a resin surface forming the carrier jig.

22. The carrier jig of claim 19 which is a silicon wafer carrier having at least one groove for holding a wafer.

23. A carrier jig for use in an electronic field which is made from the destaticizing thermoplastic resin composition of claim 7.

24. The carrier jig of claim 23, wherein differences (relationship among average values, minimum values and maximum values) in saturation voltage and voltage half-attenuation time when an arbitrary surface area measuring 125 mm in length and 150 mm in width of the carrier jig is measured at an application voltage of 10 kV satisfy the following expressions at the same time, $$E_{max} (V) - 100 (V) \leq E_{ave} (V) \leq E_{min} (V) + 100 (V)$$

$$T_{max} (s) - 5 (s) \leq T_{ave} (s) \leq T_{min} (s) + 5 (s)$$

wherein $E_{ave}$, $E_{max}$ and $E_{min}$ are average, maximum and minimum values of saturation voltage and $T_{ave}$, $T_{max}$ and $T_{min}$ are average, maximum and minimum values of voltage half-attenuation time, respectively.

25. The carrier jig of claim 23, wherein the surface area to be measured is an arbitrary flat portion of a resin surface forming the carrier jig.

26. The carrier jig of claim 23 which is a silicon wafer carrier having at least one groove for holding a wafer.

27. A carrier jig for use in an electronic field which is made from the destaticizing thermoplastic resin composition of claim 13.

28. The carrier jig of claim 27, wherein differences (relationship among average values, minimum values and maximum values) in saturation voltage and voltage half-attenuation time when an arbitrary surface area measuring 125 mm in length and 150 mm in width of the carrier jig is measured at an application voltage of 10 kV satisfy the following expressions at the same time, $$E_{max} (V) - 100 (V) \leq E_{ave} (V) \leq E_{min} (V) + 100 (V)$$

$$T_{max} (s) - 5 (s) \leq T_{ave} (s) \leq T_{min} (s) + 5 (s)$$

wherein $E_{ave}$, $E_{max}$ and $E_{min}$ are average, maximum and minimum values of saturation voltage and $T_{ave}$, $T_{max}$ and $T_{min}$ are average, maximum and minimum values of voltage half-attenuation time, respectively.

29. The carrier jig of claim 27, wherein the surface area to be measured is an arbitrary flat portion of a resin surface forming the carrier jig.

30. The carrier jig of claim 27 which is a silicon wafer carrier having at least one groove for holding a wafer.

* * * * *

UNITED STATES PATENT AND TRADEMARK OFFICE
CERTIFICATE OF CORRECTION

PATENT NO. : 6,150,446
DATED : November 21, 2000
INVENTOR(S) : Takayoshi Numata

It is certified that error appears in the above-identified patent and that said Letters Patent is hereby corrected as shown below:

<u>Title page, item [30],</u>
Priority Number "9-234278" should read -- 9-234478 --;
Priority Number "9-264479" should read -- 9-234479 --.

Signed and Sealed this

Second Day of October, 2001

Attest:

*Nicholas P. Godici*

NICHOLAS P. GODICI
*Attesting Officer*     *Acting Director of the United States Patent and Trademark Office*